United States Patent

Kawanishi et al.

[19]

[11] Patent Number: 6,046,411
[45] Date of Patent: Apr. 4, 2000

[54] WEIGHING AND PACKING SYSTEM

[75] Inventors: Shozo Kawanishi, Nishinomiya; Hiroshi Higuchi, Takasago, both of Japan

[73] Assignee: Yamato Scales Co., Ltd., Hyogo, Japan

[21] Appl. No.: 08/916,686

[22] Filed: Aug. 22, 1997

[30] Foreign Application Priority Data

| Aug. 23, 1996 | [JP] | Japan | 8-222140 |
| Jan. 30, 1997 | [JP] | Japan | 9-017070 |

[51] Int. Cl.[7] .......................... G01G 19/22; G01G 13/00
[52] U.S. Cl. ..................... 177/25.13; 177/25.18
[58] Field of Search ............... 177/25.14, 25.18, 177/25.13

[56] References Cited

U.S. PATENT DOCUMENTS

| Re. 35,050 | 10/1995 | Gibbs et al. | 177/25.14 |
| 4,658,919 | 4/1987 | Nobutsugu | 177/25.18 |
| 4,694,920 | 9/1987 | Naito et al. | 177/25 |
| 4,696,358 | 9/1987 | Doerman et al. | 177/145 |
| 4,727,947 | 3/1988 | Naito | 177/164 |
| 4,771,836 | 9/1988 | Naito et al. | 177/25.18 |
| 4,804,052 | 2/1989 | Griffen | 177/25.14 |
| 4,813,205 | 3/1989 | Mikata et al. | 53/53 |
| 4,815,547 | 3/1989 | Dillon et al. | 177/25.14 |
| 4,840,240 | 6/1989 | Toyoda et al. | 177/25.18 |
| 4,850,442 | 7/1989 | Naito et al. | 177/164 |
| 4,901,506 | 2/1990 | Weyandt | 53/479 |
| 5,076,375 | 12/1991 | Dillon et al. | 177/25.14 |

FOREIGN PATENT DOCUMENTS

| 0284753 | 10/1985 | European Pat. Off. | G01G 23/01 |
| 61196125 | 2/1985 | Japan | G01G 13/00 |
| 08210908 | 10/1995 | Japan | G01G 19/387 |

OTHER PUBLICATIONS

Robert F. Graf, "Modern Dictionary of Electronics, 6th ed." Prentice Hall Computer Publishing, Carmel Indiana, pp. 570–571, 1992.

Kerl, H.D., "A Communication System Not Only for Weighing Techniques," Messen Prufen Automatisieren, Internationales.

Fachjournal für Mess–Steuer–Und Regeltechnik, No. 7–8, Jul. 1985, pp. 396–399 (English Translation).

Clevermann, K., "Development Trends in Automated Weighing Techniques," Messen Tm. 1982–1988, Incomplete, vol. 58, No. 5 May 1991, pp. 184–187 (English Translation).

*Primary Examiner*—Randy W. Gibson
*Attorney, Agent, or Firm*—Senniger, Powers, Leavitt & Roedel

[57] ABSTRACT

A weighing and packing system is provided having excellent quick response to control information and capable of easily adding and changing hardware. A weighing driving section 12 is provided on each weighing unit 11 forming a combination scale of a weighing system 121. The weighing driving section 12 is formed by a CPU board 13, motor drivers 14 and 15 for driving stepping motors 18 and 19, a load cell 20, an A/D converter 16, and a feeder driver 17 for driving a feeder 21. The CPU board 13 is connected to a LAN cable 23 through a LAN interface 22. An interface board 89 having a first interface 85 is connected to the LAN cable 23, which are connected to a second interface 84 provided on a packing control section 82 on a packing system 122 side through four parallel signal lines. In addition, a weighing control unit 26 for giving control information is provided on the weighing driving section 12 of the weighing unit 11. The weighing control unit 26 is connected to the LAN cable 23 and is connected to the packing control section 82 through a serial line 32*b*.

10 Claims, 14 Drawing Sheets

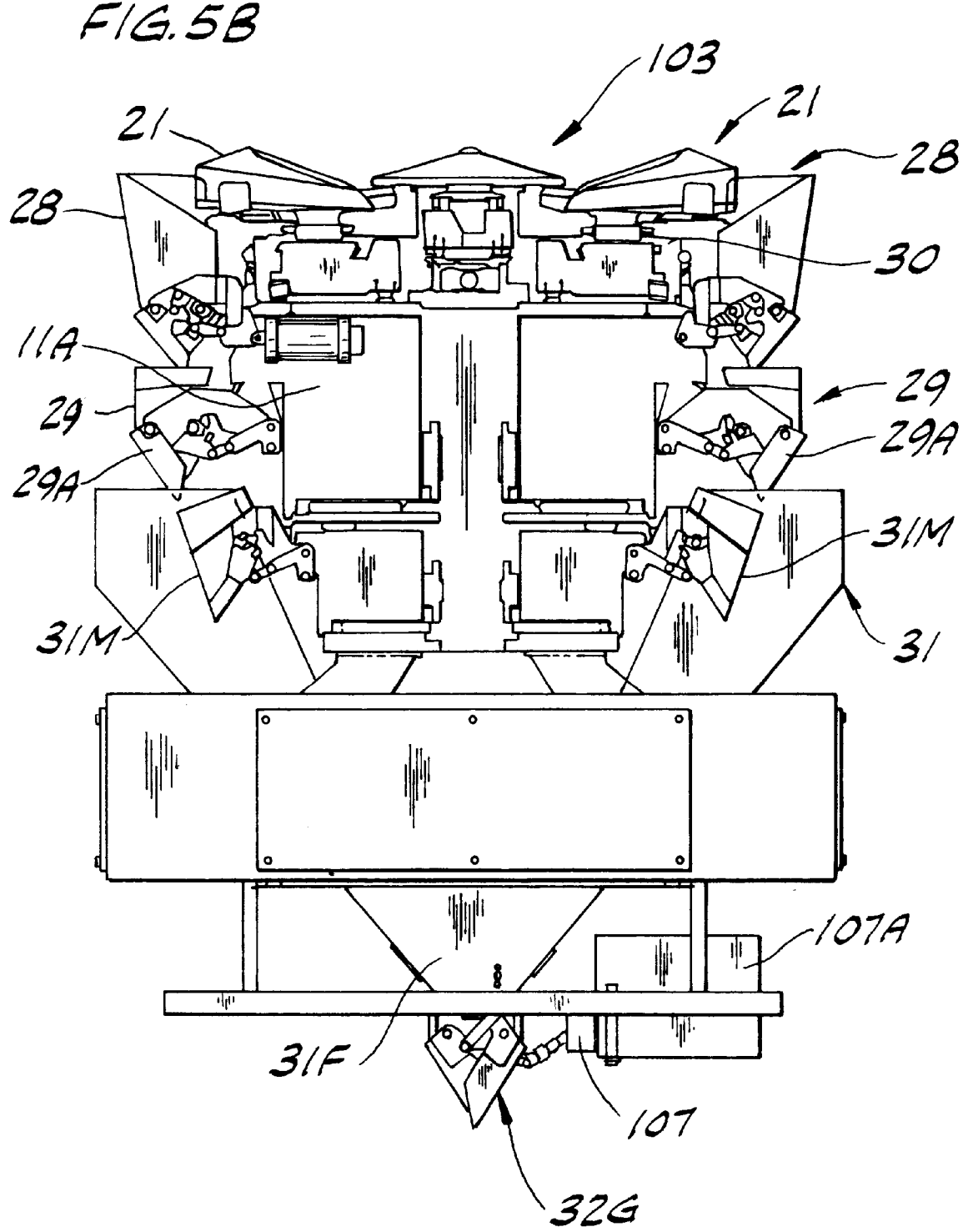

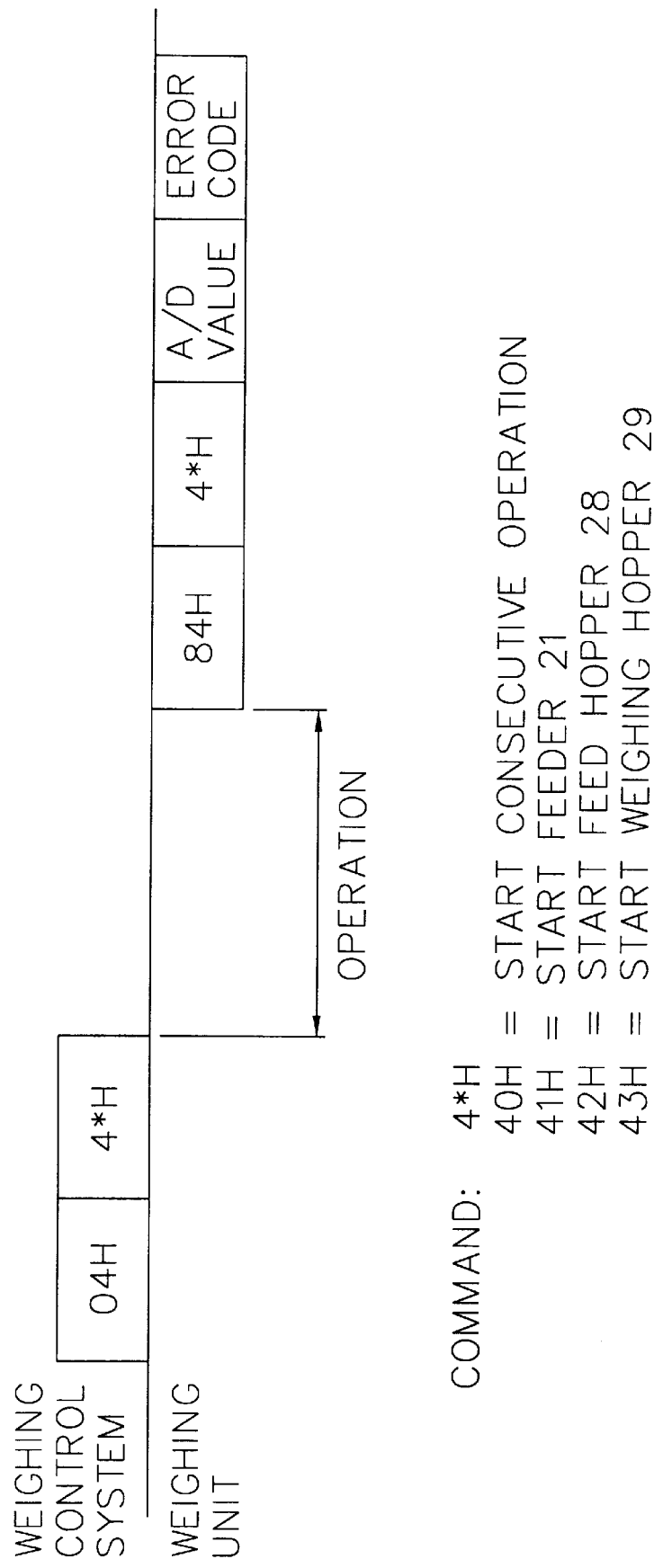

ded corresponding to n the weighing and packing system of the prior art,

WEIGHING AND PACKING SYSTEM

BACKGROUND OF THE INVENTION

1. Field of the Invention

The present invention relates to a weighing system, a packing system and a weighing and packing system, and more particularly to a weighing system, a packing system and a weighing and packing system in which a weighing driving section of each of a plurality of weighing units, a weighing control section for controlling the weighing driving section, a packing driving section of a packer, a packing control section for controlling the packing driving section and the like are coupled through a LAN.

2. Description of the Related Art

Conventionally, a combination scale has been combined with a packer to form a weighing and packing system to be used. FIG. 13 shows a weighing and packing system according to the prior art. The weighing and packing system comprises a scale driving section 182 for driving a combination scale body 183, and a weighing control section 181 for controlling the scale driving section 182. The weighing control section 181 is connected to a SIO (serial interface) 199a of a control indicating section 198 through a SIO 190a. Weighing data and the like sent from the combination scale body 183 is converted to digital information by an A/D converter 184, and the digital information is transmitted to the control indicating section 198 through the SIO 190a.

The weighing and packing system comprises a packing driving section 187 for driving a packer body 188, and a packing control section 186 for controlling the packing driving section 187. The packing control section 186 is connected to a SIO 199b of the control indicating section 198 through a SIO 190b. Temperature information and the like sent from the packer body 188 is converted to digital information by an A/D converter 189, and the digital information is transmitted to the control indicating section 198 through the SIO 190b.

The control indicating section 198 includes a microcomputer 197, an operation input section 191, a display section 192, and the SIOs 199a and 199b. Furthermore, the microcomputer 197 has a key input register 193, an operating condition table 194, an operation state register 195, a display buffer 196 and the like.

In the weighing and packing system, control information is sent from the microcomputer 197 to the weighing control section 181 in response to input from the operation input section 191. The weighing control section 181 controls the scale driving section 182 on the basis of the control information so that the combination scale body 183 is caused to operate. Data such as a weighed value sent from the combination scale body 183 is converted to a digital value by the A/D converter 184, and the digital value is sent to the control indicating section 198 and is displayed by the display section 192. In a packer control section 190, the packing driving section 187 is controlled according to an instruction sent from the control indicating section 198 so as to pack articles to be weighed which are fed from the combination scale body 183. Data obtained from the packer, for example, a seal temperature or the like, is converted to a digital value by the A/D converter 189, and the digital value is sent to the control indicating section 198 and is displayed by the display section 192. Thus, in the weighing and packing system, combination weighing and packing operation is performed under unified control of the control indicating section 198.

In the system shown in FIG. 13, however, data are transferred through the SIOs 190a, 190b, 199a and 199b, and a transmission line formed by a serial line. For this reason, there is a problem that the system has poor quick response to the control information and the like sent from the combination scale body 183 to the packer body 188 after completion of weighing operation. In addition, if abnormalities are caused on the combination scale body 183 or the packer body 188, it is impossible to rapidly halt the weighing and packing operation. Furthermore, if abnormalities are caused on transmission lines connecting the SIOs 190a and 199a and the SIOs 190b and 199b, the weighing and packing operation should be halted.

In the prior art system shown in FIG. 13, if the weighing units forming the combination scale are to be exchanged or added, the operation should be stopped. As a result, the operational efficiency of the system is lowered. Also in the packer body, if a section forming the packer body, for example, a sensor for a seal temperature is to be added, hardware of the packer control section 190 should be changed correspondingly.

SUMMARY OF THE INVENTION

In order to solve the above-mentioned problems of the prior art, it is an object of the present invention to provide a weighing and packing system in which quick response to control information is excellent, it is not necessary to halt the weighing and packing operation even if abnormalities are caused on a transmission line, and sections forming a combination scale and a packer body can easily be added and changed if necessary.

In the weighing and packing system according to the present invention, a local area network (LAN) is provided so that control information and data can be transferred at a high speed and hardware can rapidly be added and changed.

According to another embodiment of the weighing and packing system of the present invention, a parallel transmission line such as a parallel signal line and a data interface such as a signal transmitting means are provided between a weighing system and a packing system so that control information and data can be transferred at a high speed.

According to the embodiment of the present invention, a serial signal line is provided between a weighing system and a packing system in addition to the LAN. Consequently, even if abnormalities such as disconnection of a LAN are caused, weighing and packing operation can be continued.

BRIEF DESCRIPTION OF THE DRAWINGS

FIG. 5B is a schematic side plan view showing an external structure of the weighing system in FIG. 1;

FIG. 6 is a diagram showing an example of control information to be used for the weighing system in FIG. 1;

DETAILED DESCRIPTION OF THE PREFERRED EMBODIMENTS

Figure 1:
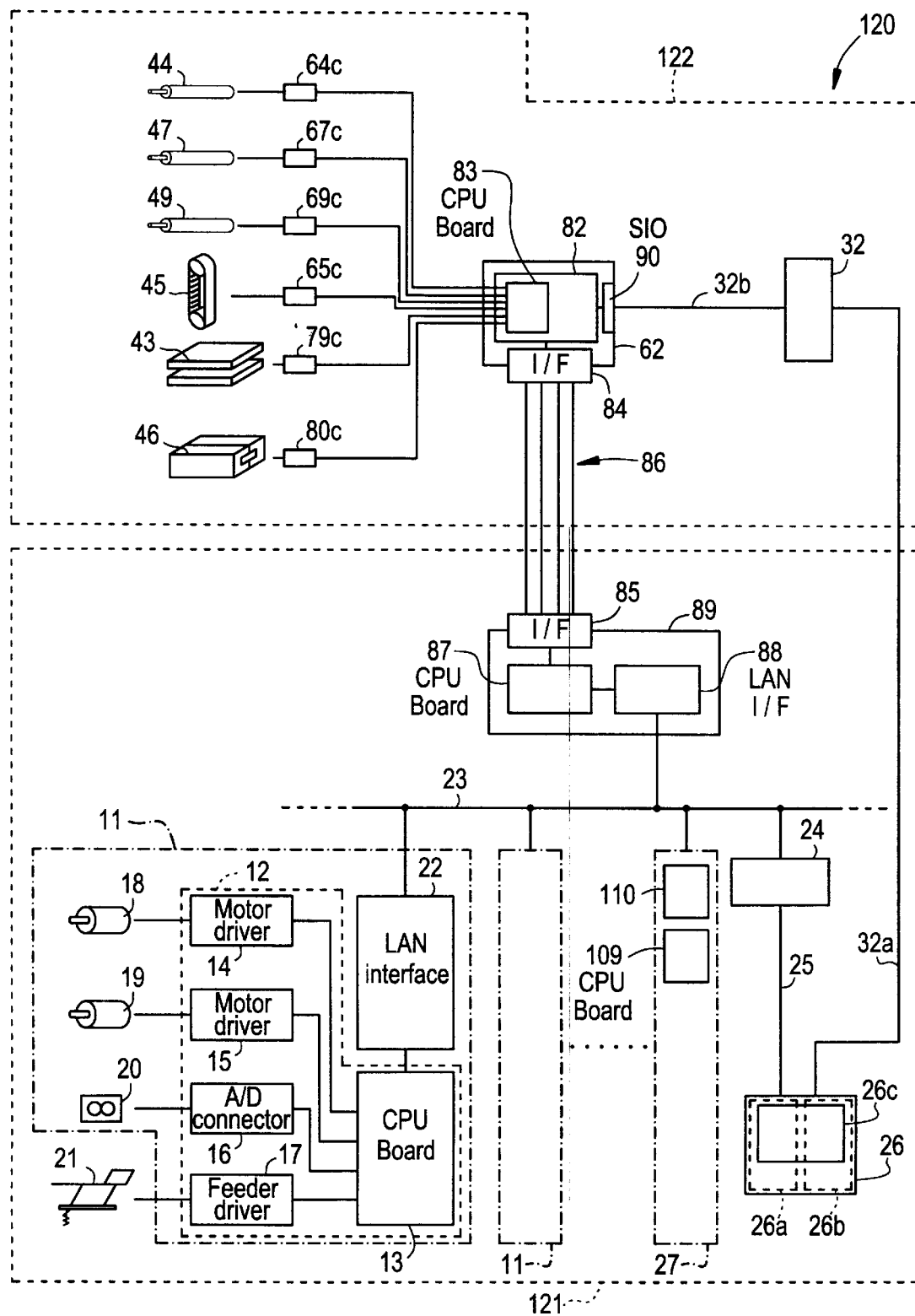
FIG. 1 is a block diagram showing a schematic structure of a weighing and packing system according to an embodiment of the present invention.

The weighing and packing system according to the present invention comprises a weighing system and a packing system. In an embodiment of the weighing system, a combination scale is formed by a plurality of weighing units.

In the weighing system, a weighing driving section for causing the weighing unit to perform weighing operation, a weighing control section for controlling the weighing driving section, and an operation indicating section for setting operating conditions of the weighing system and for displaying an operation state are mutually connected through a LAN. A first parallel interface is connected to the LAN.

The packing system according to the present invention includes a packer which has a packing driving section for causing packing operation to be performed and serves to pack articles to be weighed, a packing control section for controlling the packing driving section, and a second parallel interface. The first and second parallel interfaces are connected to each other through a parallel transmission line such as a parallel signal line. An interlock signal is sent and received between the packing driving sections through the parallel signal line. The weighing and packing system according to the present invention comprises signal transmitting means for connecting the operation indicating section of the weighing control unit of the weighing system to the packing control section. The signal transmitting means sets operating conditions of the weighing system and the packing system, and displays operation states.

According to the above-mentioned structure, since the weighing and packing system according to the present invention comprises first and second parallel interfaces and a parallel signal line, quick response to control information is excellent. Furthermore, the weighing system employs a structure of the LAN. Therefore, hardware can rapidly be added and changed in the weighing system. In addition, the operation indicating section can set operating conditions of the weighing system and the packing system and can display operation states. Therefore, single management of the weighing system and the packing system can be performed. Furthermore, even if abnormalities are caused on the LAN in the weighing system, control information is sent and received through the parallel signal line. Therefore, the weighing and packing operation is not stopped.

In the weighing and packing system according to another embodiment of the present invention, a first parallel interface is provided on a weighing system side, and inside portions of the packing system are connected through a LAN to which a second parallel interface is connected. A parallel signal line is provided between the first and second parallel interfaces. An interlock signal is sent and received between packing driving sections through the parallel signal line. Furthermore, the weighing and packing system according to the present invention comprises signal transmitting means for connecting an operation indicating section of a packing control unit of the packing system and a weighing control section. The signal transmitting means sets operating conditions of the weighing system and the packing system, and displays operation states.

According to the above-mentioned structure, since the weighing and packing system according to the present invention comprises a parallel signal line, quick response to control information is excellent. Furthermore, the packing system employs the LAN. Therefore, hardware can rapidly be added and changed in the packing system. In addition, the operation indicating section can set operating conditions of the weighing system and the packing system, and can display operation states. Therefore, single management of the weighing system and the packing system can be performed. Furthermore, even if abnormalities are caused on the LAN of the packing system, control information is sent and received through the parallel signal line. Therefore, the weighing and packing operation is not stopped.

A weighing and packing system according to yet another embodiment of the present invention comprises a weighing system and a packing system which have LANs, respectively. The respective LANs are further connected to form a single LAN. This system also has excellent quick response to control information and flexibility with addition and change of hardware as described above. In addition, weighing and packing operation can be continued even if abnormalities are caused on the LAN.

A weighing and packing system according to a further embodiment of the present invention has a structure in which the weighing driving section, the packing driving section and a weighing and packing control unit including the weighing control section, the packing control section and the operation indicating section are mutually connected through a single LAN. This system also has excellent quick response to control information and flexibility with respect to addition and change of hardware, and can continue weighing and packing operation even if abnormalities are caused on the LAN. In addition, the operation indicating section can set operating conditions of a weighing system and a packing system, and can display operation states. Therefore, single management of the weighing system and the packing system can be performed.

In addition, the weighing and packing system according to the present invention can have a structure in which first and second serial interfaces and a serial signal line are provided in place of the first and second parallel interfaces and the parallel signal line. By this structure, if abnormalities are caused on the LAN, an interlock signal can be sent and received through the serial signal line. Therefore, it is not necessary to stop the weighing and packing operation. Also in the case where the interlock signal is transmitted late through the LAN and the like for some reasons, it can be sent and received through the serial signal line. If abnormalities are caused on the signal transmitting means between the operation indicating section and the packing control section or the weighing control section, the signal can be received around the serial signal line.

Preferred embodiments of the present invention will be described below with reference to the drawings.

Figure 2:
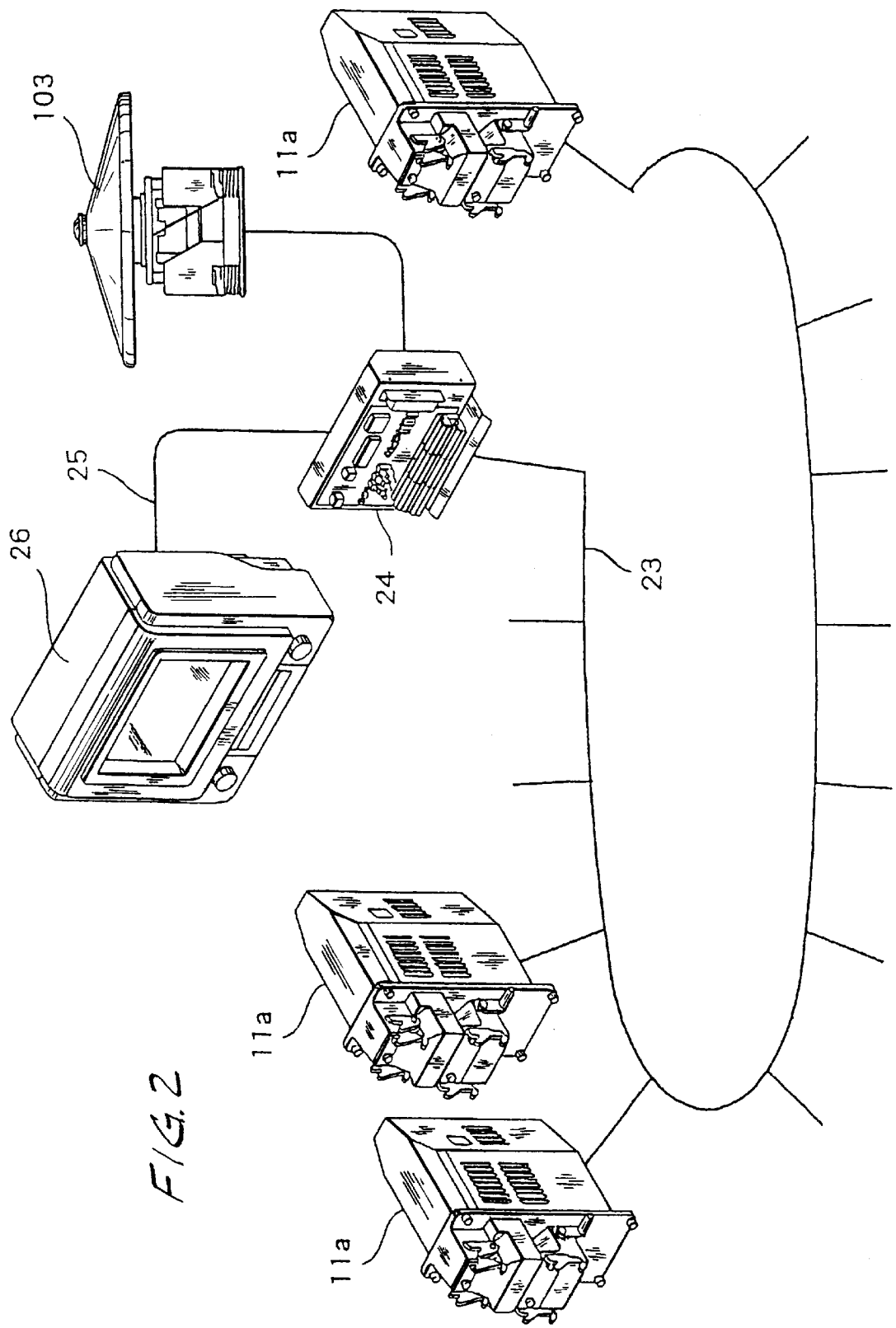
FIG. 2 is a view conceptually showing a weighing system in FIG. 1.
Figure 3:
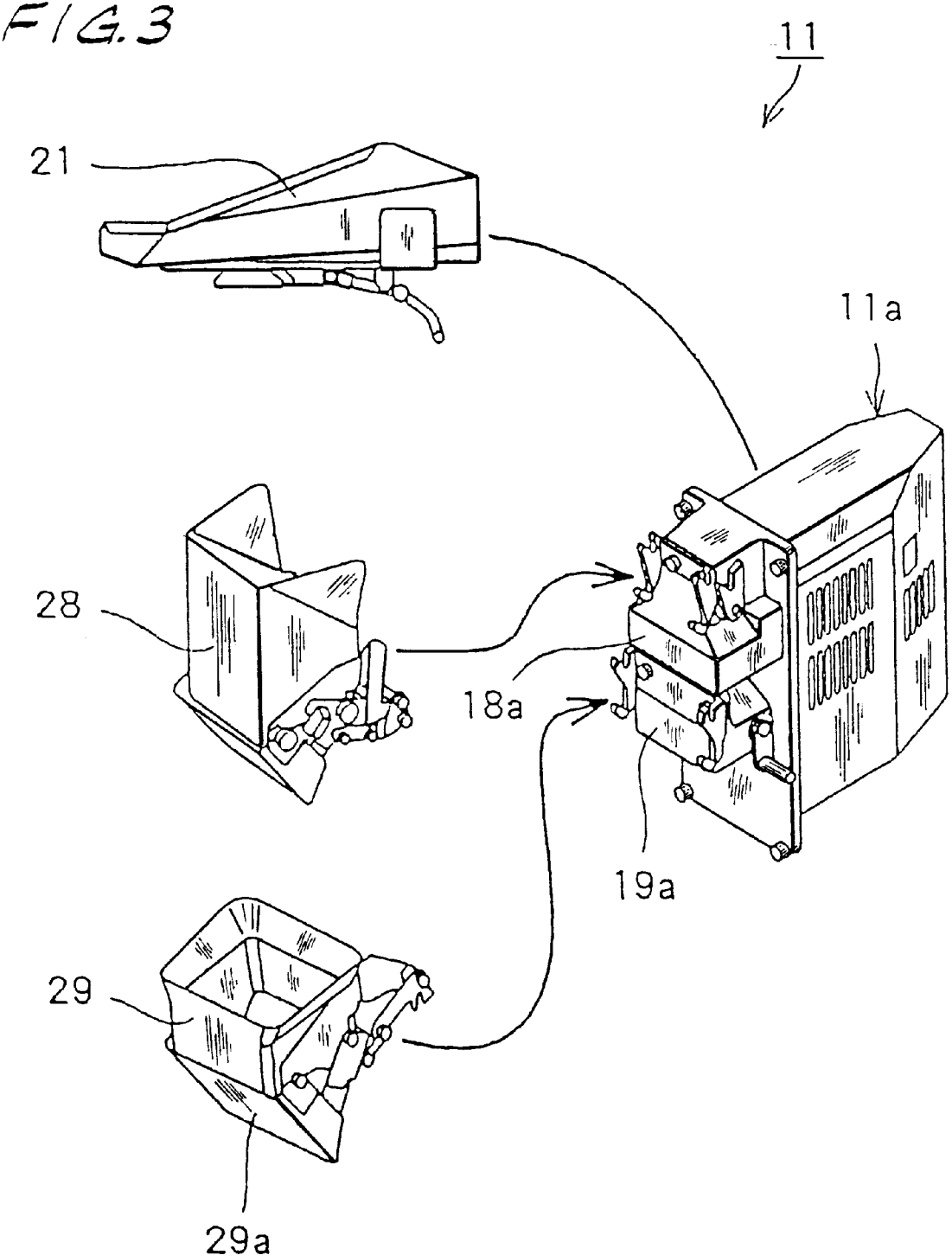
FIG. 3 is a perspective view showing a structure of a weighing unit in FIG. 1.

FIG. 1 is a block diagram showing a schematic structure of a weighing and packing system 120 according to an embodiment of the present invention. The weighing and packing system 120 according to the present embodiment comprises a weighing system 121 and a packing system 122. The weighing system 121 includes a LAN which is conceptually shown in FIG. 2. FIG. 3 is a perspective view showing an external structure of a weighing unit 11 which will be described below. As shown in FIG. 1, the weighing system 121 of the weighing and packing system 120 according to the present embodiment has a structure in which a combination scale (not shown) is formed by a plurality of weighing units 11, each of which has a weighing driving section 12 for causing a weighing operation to be performed. The weighing driving section 12 includes a CPU board 13, motor drivers 14 and 15 for driving stepping motors 18 and 19 respectively, an A/D converter 16 for A/D converting a weighed value of an article to be weighed which is sent from a load cell 20, and a feeder driver 17 for driving a feeder 21. In the present embodiment, the weighing unit 11 does not include the feeder 21 but it does include the feeder driver 17. The CPU board 13 is connected to a LAN cable 23 through a LAN interface 22. While the feeder driver 17 is included in the weighing unit 11 in the present embodiment, it may be attached to the feeder 21 to which only a control signal is sent from the weighing unit 11.

As shown in FIG. 3, the weighing unit 11 has a weighing unit body 11a. The feeder 21 which is driven by the feeder driver 17 (FIG. 1) is attached to a top of the weighing unit body 11a. The feeder operates to feed a quantity of articles to be weighed to a feed hopper 28 adjacent the weighing unit body 11a. A stepping motor 18 (FIG. 1) operates an actuating device 18a on the weighing unit body 11a for opening and closing a gate of the feed hopper 28. The feed hopper 28 is removably attached to the actuating device 18a. The stepping motor 18 and actuating device 18a function as actuating means for operating the feed hopper 28. A weighing hopper 29 is positioned below the feed hopper 28 for receiving articles discharged from the feed hopper. A stepping motor 19 (FIG. 1) operates an actuating device 19a on the weighing unit body 11a for opening and closing a gate 29a of the weighing hopper 29. The weighing hopper 29 is removably attached to the actuating device 19a. The stepping motor 19 and actuating device 19a function as actuating means for operating the weighing hopper 29. A solenoid, an air cylinder, a servo motor and the like can be used as the actuating device for the hoppers 28 and 29. The motor drivers 14 and 15, the A/D converter 16 and the feeder driver 17 are controlled by the CPU board 13. For simplicity, only the weighing unit body 11a is shown in FIG. 2. While only the feed hopper 28 and the weighing hopper 29 are provided as described above, a memory hopper 31M for holding weighed articles can further be provided, for example, as will be understood by those skilled in the field of combination weighing machines.

Figure 4:
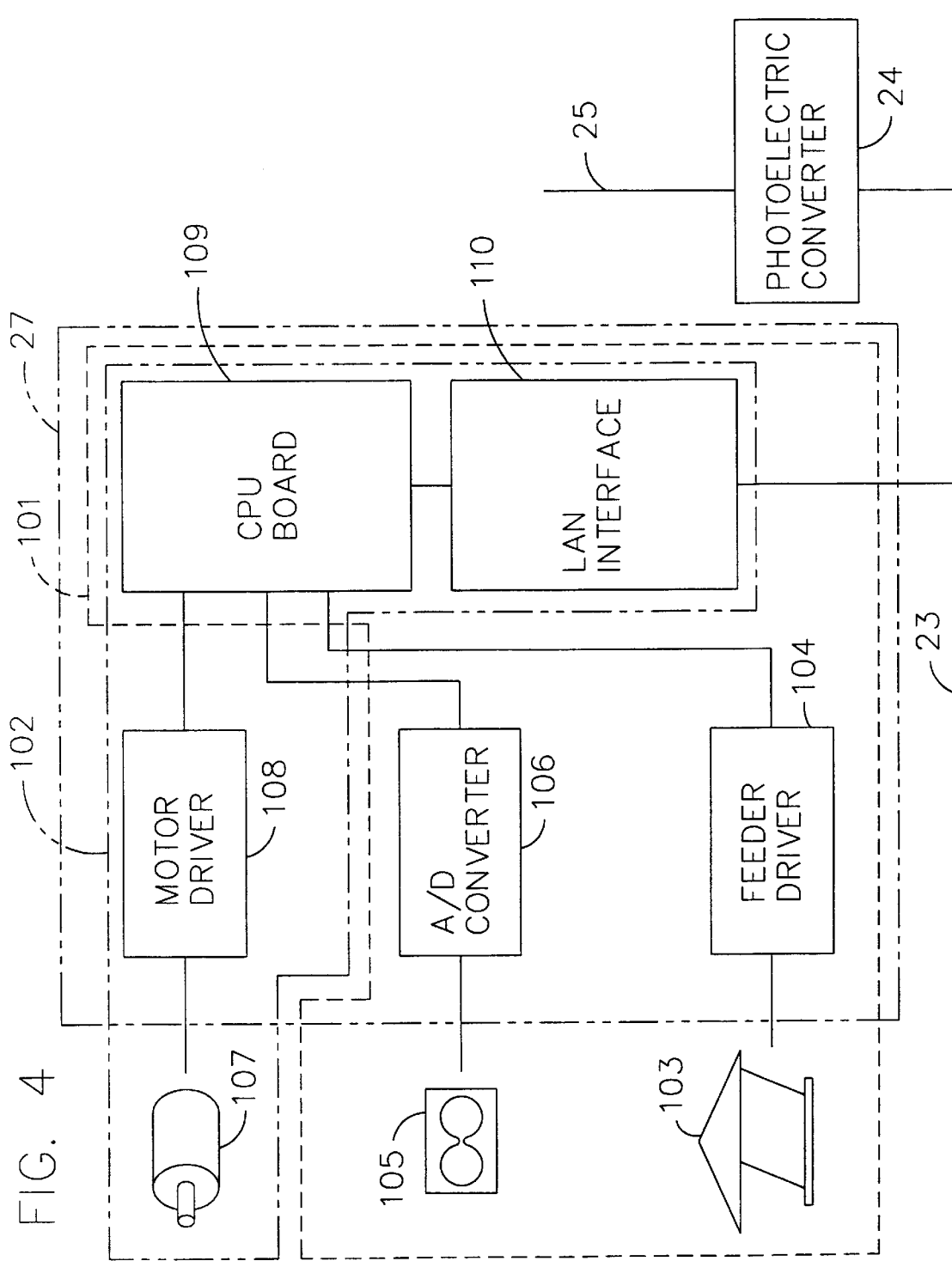
FIG. 4 is a block diagram showing a structure of a feed-discharge control section in FIG. 1.

As shown in FIG. 1, the weighing system 121 according to the present embodiment comprises a feed-discharge control section 27 for controlling feed and discharge of articles to be weighed. FIG. 4 shows a block structure of the feed-discharge control section 27. As shown in FIG. 4, the feed-discharge control section 27 includes a center vibrator unit 101 and an assembled gate unit 102.

The center vibrator unit 101 has a center vibrator 103 for feeding articles to be weighed to the feeder 21 of the weighing unit 11 by vibration, and a feeder driver 104 for driving the center vibrator 103. The feeder driver 104 operates under the control of a CPU board 109 to regulate the quantity of articles fed from the center vibrator 103 to the feeder 21 (FIG. 3.) of each weighing unit 11. The center vibrator unit 101 has an A/D converter 106 for A/D converting a weighed value in a level sensor load cell 105 for weighing the articles on the center vibrator 103. A digital value obtained by conversion is sent to the CPU board 109. The CPU board 109 is connected to the LAN cable 23 through a LAN interface 110. In the present embodiment, the center vibrator unit 101 is formed by the center vibrator 103, the feeder driver 104, the A/D converter 106, the CPU board 109 and the LAN interface 110. The CPU board 109 and the LAN interface 110 are shared with the assembled gate unit 102, which will be described below.

An optical sensor for product level detection and an optical sensor controller can be used in place of the level sensor load cell 105 and the A/D converter 106. The level sensor load cell 105 and the optical sensor for product level detection function as means for detecting a quantity of the articles on the center vibrator to be weighed. The A/D converter 106 and the optical sensor controller function as digital converting means.

Figure 5A:
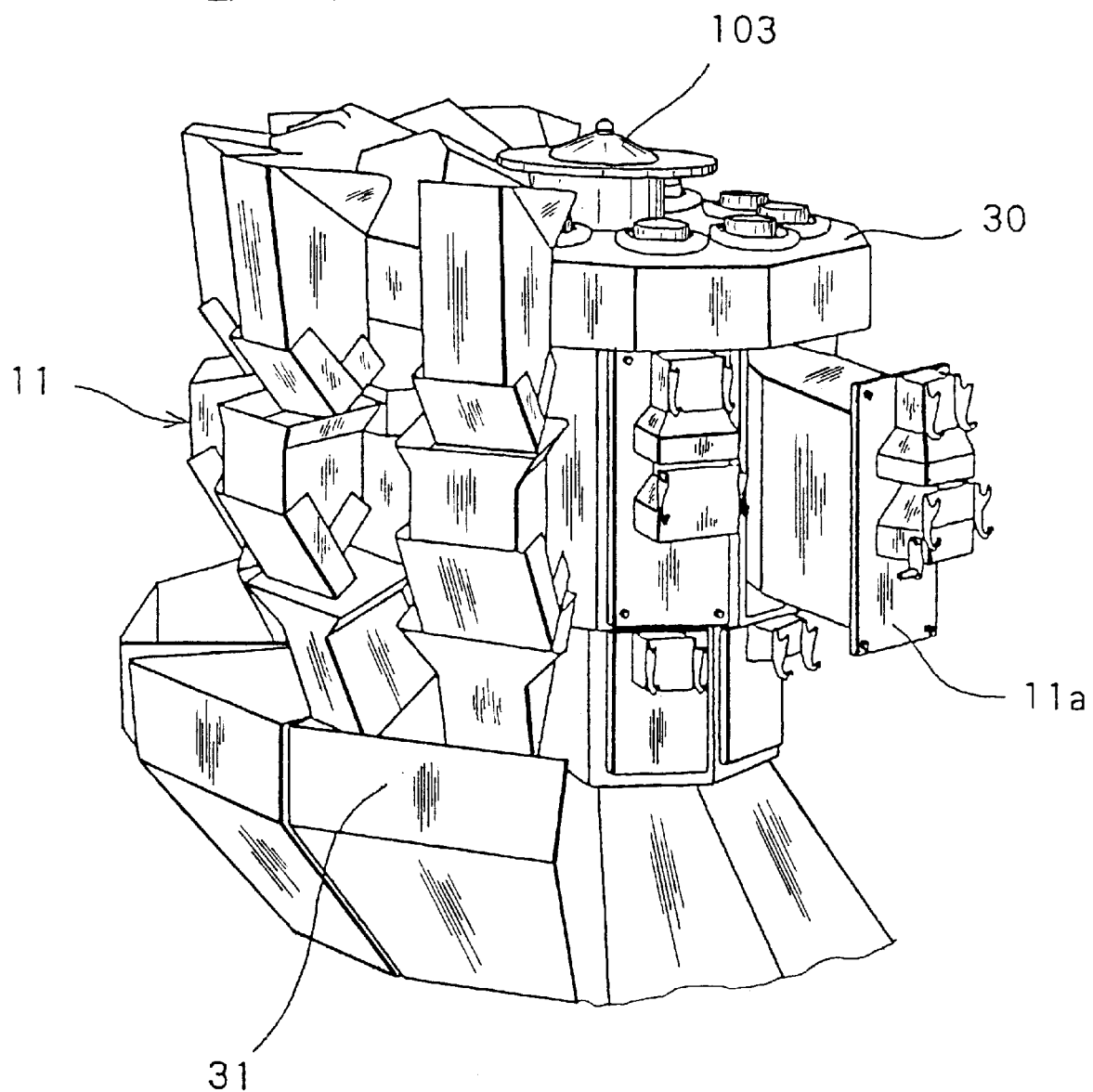
FIG. 5A is a perspective view showing an external structure of the weighing system in FIG. 1.

As will be understood by those skilled in the field of combination weighing, the weighing system 121 is operable to calculate combinations of weights held by the weighing hoppers 29 of the weighing units 11 and then to select a combination of weights falling within a predetermined target range of weights. The articles in the weighing hoppers 29 corresponding to the selected combination are discharged from the hoppers into a collection chute 31, as shown in FIG. 5A and 5B. The assembled gate unit 102 comprises a chute gate 32G provided in a lower portion of the collection chute 31. The chute gate is opened and closed by a chute gate motor 107 which is part of the chute gate actuating means 107A. When the chute gate is closed, articles are stored within the collection chute; when the gate is opened, articles in the chute are discharged from the chute for delivery to a packer in a predetermined timing (i.e., in timed relationship with the operation of the packer). The chute gate motor 107 is driven by a motor driver 108 under control of the CPU board 109. In the present embodiment, the assembled gate unit 102 is formed by the chute gate motor 107, the motor driver 108, the CPU board 109 and the LAN interface 110. The CPU board 109 and the LAN interface 110 are shared with the center vibrator unit 101 as described above.

Furthermore, the weighing system 121 according to the present embodiment is provided with a weighing control unit 26 connected to the LAN cable 23 through an optical fiber 25 and a photoelectric converter 24 as shown in FIG. 1. The weighing control unit 26 includes a weighing control section 26a, an operation indicating section 26b and a display section 26c formed of a LCD or the like. The operation indicating section 26b causes the display section 26c to display a prompt screen, inputs a target weight of the articles to be weighed, upper and lower bound (limit) values thereof, switching times of the hoppers 28 and 29, delay times of various operations, and operating conditions of the feeder 21 and the like, and sets the same conditions to the CPU board 13 of the weighing unit and the weighing control section 26a. The operation indicating section 26b causes the display section 26c to properly display the weighed values of articles during operation, an average value thereof, a standard deviation, a weighing speed, hoppers used for a combination, operating conditions, operation states, the indication of an alarm, the reason(s) for an indicated alarm and the like. In the present embodiment, the weighing control section 26a performs single management of the whole weighing system 121. The photoelectric converter 24 can be housed in an I/O box or the like together with the feed-discharge control section 27 shown in FIG. 4, for example.

Actually, the weighing system 121 according to the present embodiment has an external structure shown in FIGS. 5A and 5B. As shown in FIGS. 5A and 5B, the weighing unit 11 is fixed around a center column 30, and the center vibrator 103 is fixed in the center on top of the center column 30. The collection chute 31 is provided adjacent a lower portion of the center column 30. The collating funnel 31F and the chute gate 32G are provided below the chute 31. The packer (not shown) is provided below the chute gate 32G.

FIG. 6 shows an example of control information to be used by the LAN shown in FIGS. 1 and 2. In the example of FIG. 6, control information in the form of "04H, 4*H" ("H" represents a hexadecimal number) is sent from the weighing control section 26a of the weighing control unit 26 to the LAN. "04H" is a header code which means an instruction issued from the weighing control section 26a to the weighing unit 11 and represents that the next instruction "4*H" should be executed by the weighing unit 11. The instruction "4*H" is a general term for instructions "40H to 43H" as shown in FIG. 6. The weighing unit 11 executes the instructions "40H to 43H" shown in FIG. 6.

The weighing unit 11 which has executed the instructions "40H to 43H" sends, to the LAN, response information including "84H, 4*H, an A/D value and an error code" as shown in FIG. 6. "84H" means a response issued from a specific weighing unit 11 to the weighing control section 26a. "4*H" means a response to a result of execution of the instructions "40H to 43H". The A/D value is data representing the weight of articles weighed by the weighing unit 11. The error code represents a kind of malfunction generated by the weighing unit 11.

Figure 7:
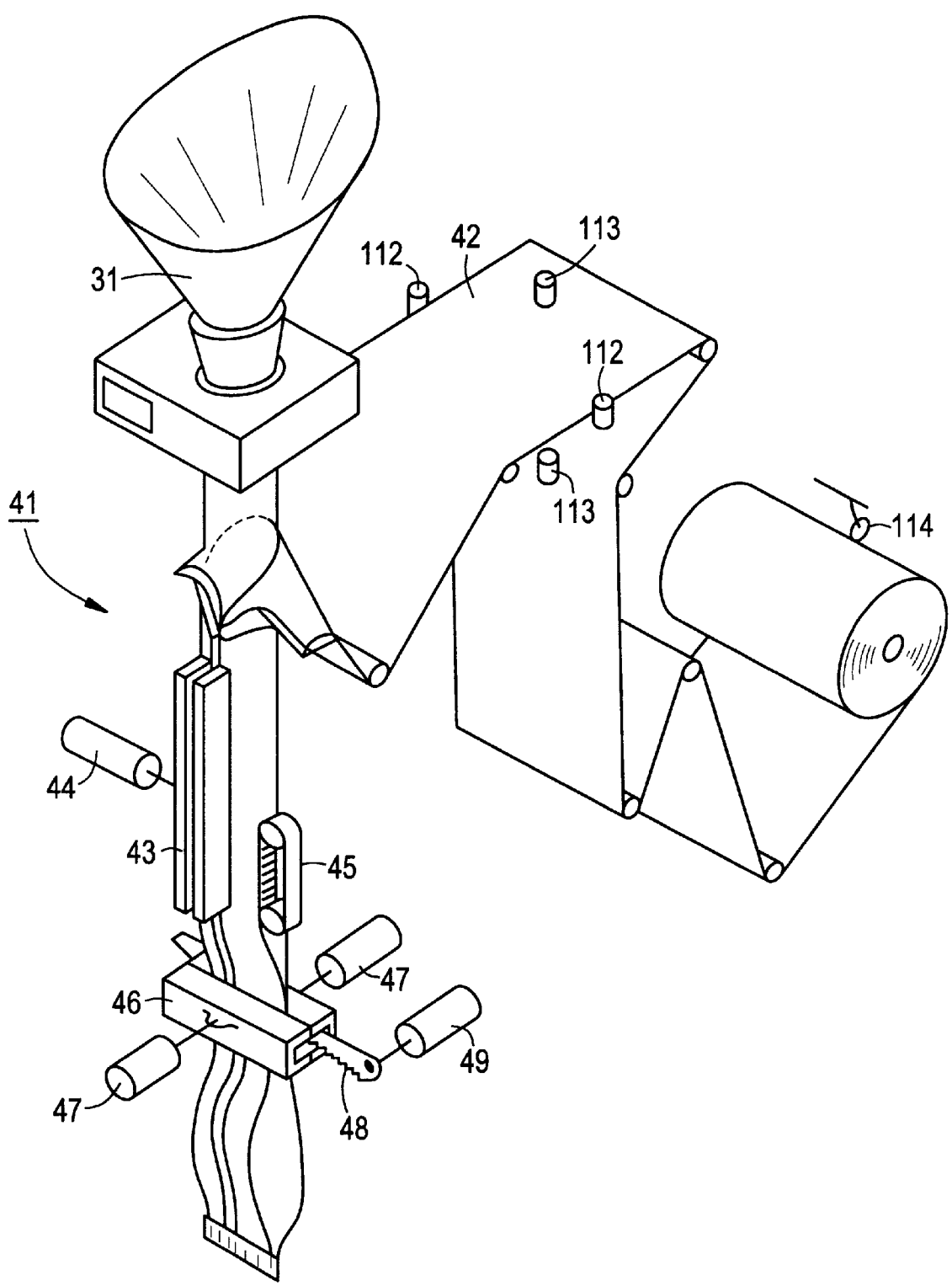
FIG. 7 is a perspective view showing an appearance of a packer forming a packing system in FIG. 1.

The packing system 122 of the weighing and packing system according to the present embodiment is shown in FIG. 1 described above. The packing system 122 according to the present embodiment does not employ the structure of the LAN. FIG. 7 shows an embodiment of a packer 41 forming the packing system 122. As shown in FIG. 7, the packer 41 is a vertical form, fill and seal machine of the type well known in the art for making bags from heat sealable film. The machine includes a pair of longitudinal heat seal bars 43 operated by one or more air cylinders 44 for heat sealing a web of packing film 42 formed around a mandrel, the bars being closeable on overlapping edges of the film to make a longitudinal bag seal. The machine also includes a pull belt 45 for pulling the film 42 downward on the mandrel, and a pair of transverse heat seal bars 46 operated by one or more air cylinders 47 for making a transverse bottom bag seal across the film and then, after the film has been fed downwardly and filled with weighed articles from chute 31, making a transverse top bag seal across the film to close the bag. A cutter 48 is provided for cutting the packing film 42 across the top transverse seal to sever the completed bag from the web. An air cylinder 49 drives the cutter 48. In the present embodiment, the heat seal bars 43 and 46 are used as heat seal means, and the air cylinders 44 and 47 are used for opening and closing the heat seal bars. Alternatively, a motor or the like can be used to open and close the bars.

According to the present embodiment, the air cylinder 44 for longitudinal seal, the air cylinder 47 for transverse seal, the air cylinder 49 for the cutter 48, and the pull belt 45 are connected to drivers 64c, 67c, 69c and 65c, respectively, as shown in FIG. 1. The longitudinal heat seal bars 43 and the transverse heat seal bars 46 are connected to temperature controllers 79c and 80c, respectively.

The drivers 64c, 67c, 69c and 65c and the temperature controllers 79c and 80c are connected to a CPU board 83 in a packing control section 82. The CPU board 83 is connected to a second parallel interface 84 which is connected to a first parallel interface 85 of an interface board 89 of the weighing system 121 through a parallel transmission line such as a parallel signal line 86. In the present embodiment, a CPU board 87 and a LAN interface 88 provided on the interface board 89 may be shared with the CPU board 109 and the LAN interface 110 of the feed-discharge control section 27 shown in FIG. 4, and the first parallel interface 85 may be connected to the CPU board 109.

In the present embodiment, an optical fiber 32a, a photoelectric converter 32 and a serial line 32b are provided, which serially connect the operation indicating section 26b of the weighing control unit 26 of the weighing system 121 to the packing control section 82 of the packing system. The optical fiber 32a, the photoelectric converter 32 and the serial line 32b function as signal transmitting means. While the signal transmitting means has been formed serially as described above in the present embodiment, it can be formed by a parallel signal line. The following information signals are transmitted by the signals transmitting means over the optical fiber 32a: instructions for starting automatic operation, for stopping automatic operation or for initiating manual operation of one or more actuators; signals indicating temperatures at which the heat seal bars should be operated; and signals coordinating the timing of the operation of one or more of the actuators.

In the present embodiment, the parallel signal line 86 is formed by four signal lines. Each signal line receives only one of four interlock signals which will be described below. More specifically, the four signal lines exclusively transmit four interlock signals, that is, "Ready Signal from Packer" which indicates that the packing system requires an article to be weighed to be put in the weighing system, "Ready Signal to Packer" which indicates that the weighing system can accept the article, "Dump Signal to Packer" which informs the packing system that the article has been put in the weighing system, and "Significant Fault Checking" by which the weighing system informs the packing system that a weight of the put article deviates from a tolerance.

The optical fiber 32a, the photoelectric converter 32 and the serial line 32b are used for the operation indicating section 26b to set operating conditions on a packing system side and to cause the display section 26c to display an operation state on the packing system side.

In the weighing and packing system 120 according to the present embodiment, the packing system 122 is connected to the weighing system 121 through the parallel signal line 86. Therefore, the interlock signal to be sent and received between the systems can be transmitted rapidly. The operation indicating section 26b can set the operating conditions of the weighing and packing system, and can display the operation state. Consequently, single management of the weighing and packing system can be performed.

Since the weighing system 121 of the weighing and packing system 120 according to the present embodiment sends and receives the control information, the response information and the like through the LAN cable 23 at a high speed, it has excellent quick response to the control information and each weighing unit can be removed and attached during operation.

While the CPU board 13 and the LAN interface 22 have separately been illustrated in the present embodiment, both functions can be fulfilled by one CPU board. Similarly, the CPU board 109 and the LAN interface 110 can be formed by one CPU board.

Figure 8:
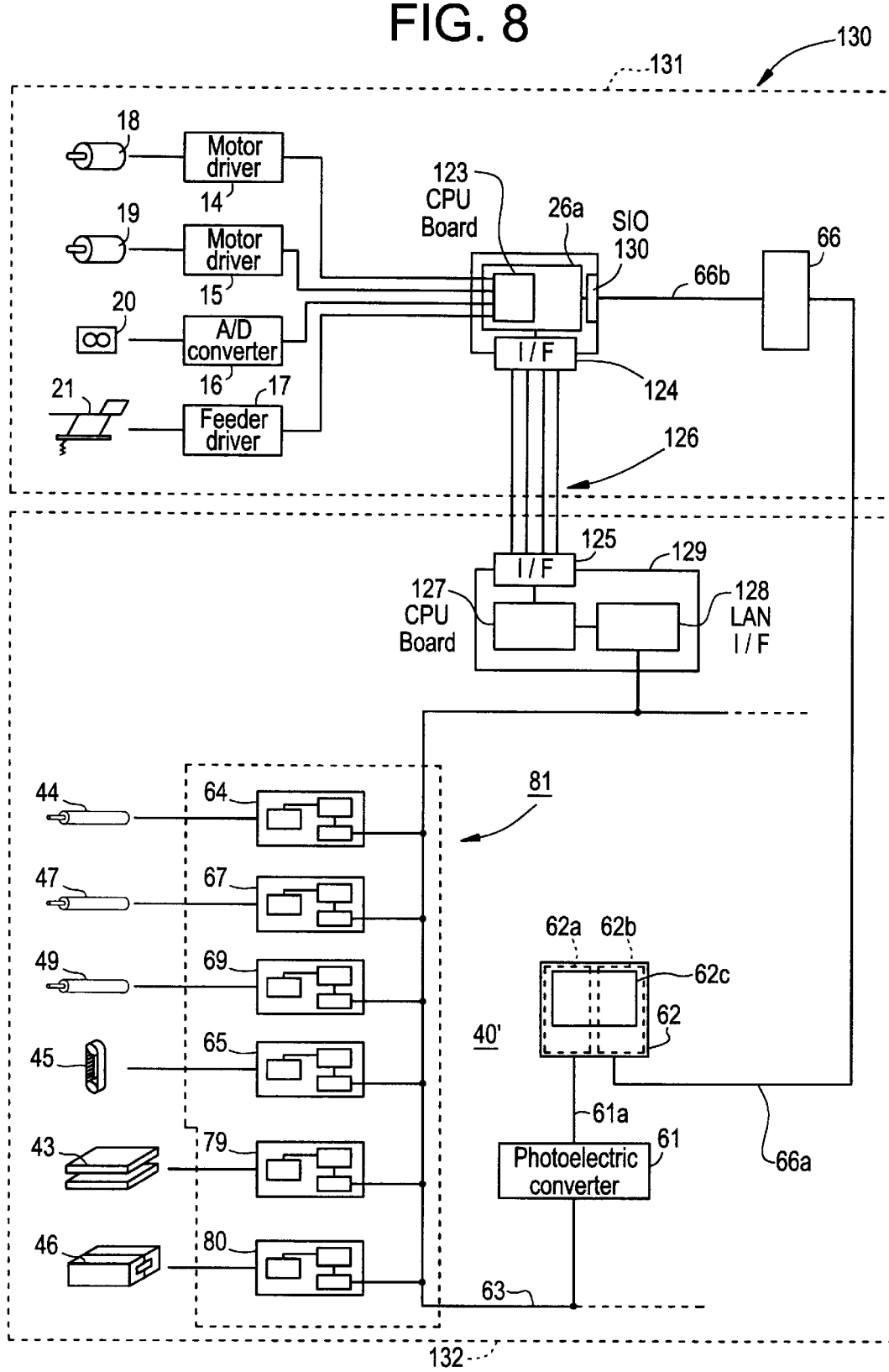
FIG. 8 is a block diagram showing a schematic structure of a weighing and packing system according to another embodiment of the present invention.

FIG. 8 shows another embodiment of the weighing and packing system according to the present invention. A weighing and packing system 130 according to the present embodiment comprises a packing system 132 formed by a LAN. In the packing system 132, an interface board 129 is connected to a LAN cable 63. The interface board 129 includes a LAN interface 128, a CPU board 127 and a first parallel interface 125 which are connected to the LAN cable 63 of the packing system 132 through the LAN interface 128.

A weighing system 131 of the weighing and packing system 130 according to the present embodiment includes stepping motors 18 and 19, motor drivers 14 and 15 for driving and controlling the stepping motors 18 and 19, a load cell 20, an A/D converter 16 for A/D converting a weighed value obtained from the load cell 20, and a feeder driver 17 for driving a feeder 21 in the same manner as in the weighing system shown in FIG. 1. However, the system according to the present embodiment is different from the weighing system 121 shown in FIG. 1 in that a weighing control section 26a is provided. In the present embodiment, furthermore, the weighing system 131 does not employ a structure of a LAN, although it is contemplated that a LAN may be part of the weighing system.

The weighing system 131 of the weighing and packing system 130 according to the present embodiment includes the weighing control section 26a on which a CPU board 123 is provided. The motor drivers 14 and 15, the A/D converter 16 and the feeder driver 17 are connected to the CPU board 123. The CPU board 123 is connected to a first parallel interface 124. The first parallel interface 124 is connected to a second parallel interface 125 of the interface board 129 of the packing system 132 through a parallel signal line 126. For simplicity, only one weighing unit is shown in FIG. 8. Actually, the motor drivers 14 and 15 and the A/D converter 16 of each of the weighing units are connected to the CPU board 123. Also in the present embodiment, the CPU board 127 and the LAN interface 128 provided on the interface board 129 can be shared with another CPU board and LAN interface.

In the present embodiment, an optical fiber 66a, a photoelectric converter 66 and a serial line 66b are provided, which serially connect an operation indicating section 62b of the packing control unit 62 of the packing system 132 to the weighing control section 26a of the weighing system. The optical fiber 66a, the photoelectric converter 66 and the serial line 66b function as signal transmitting means. While the signal transmitting means has been formed serially as described above in the present embodiment, it can also be formed by a parallel signal line. The following information signals are transmitted by the signals transmitting means over the optical fiber 66a: instructions for starting automatic operation, for stopping automatic operation or for initiating manual operation of one or more actuators; signals indicating the operating parameters (such as speed, torque, stepping pulses or position) of the motors; signals indicating the vibrating paramaters (such as strength, amplitude or frequency) of the feeder; and signals defining the period of time during which the feeder is operated.

Figure 9:
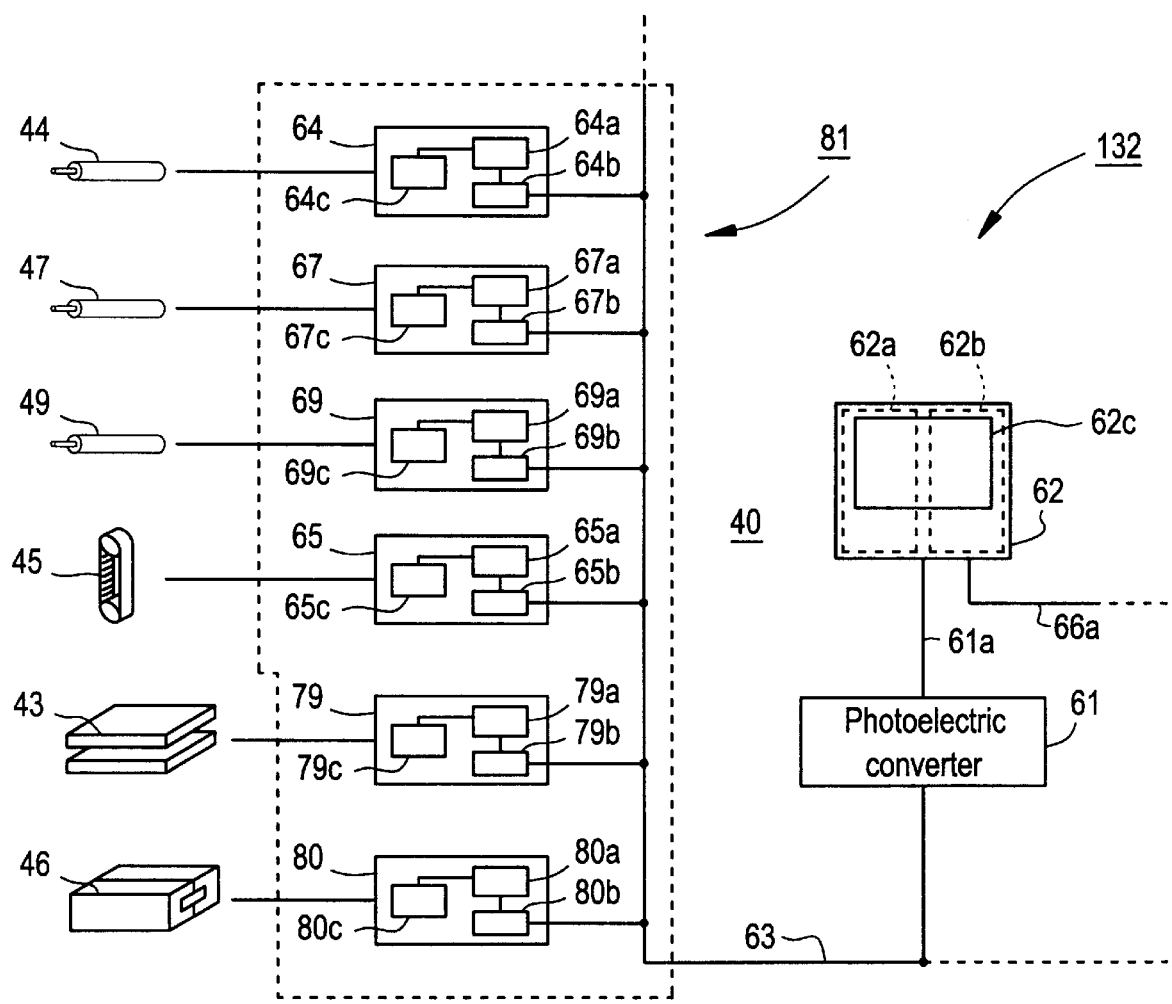
FIG. 9 is a block diagram showing a schematic structure of a packing system in FIG. 8.

FIG. 9 shows a block structure of the packing system 132 of the weighing and packing system 130 according to the present embodiment. A packer 41 forming the packing system 132 according to the present embodiment is the same as in FIG. 7. According to this embodiment, an air cylinder 44 for operating the longitudinal heat seal bars 43, an air cylinder 47 for operating the transverse heat seal bars 46, an air cylinder 49 for the cutter 48, the pull belt 45, the longitudinal heat seal bars 43 and the transverse heat seal bars 46 are connected to driving control sections 64, 67, 69, 65, 79 and 80, respectively, as shown in FIG. 9. The driving control sections 64, 67, 69, 65, 79 and 80 have CPU boards 64a, 67a, 69a, 65a, 79a and 80a, and LAN interfaces 64b, 67b, 69b, 65b, 79b and 80b, respectively. The LAN interfaces 64b, 67b, 69b, 65b, 79b and 80b are connected to the LAN cable 63. The driving control sections 64, 67, 69 and 65 connected to the air cylinder 44 for longitudinal seal, the air cylinder 47 for transverse seal, the air cylinder 49 for the cutter 48 and the pull belt 45 have drivers 64c, 67c, 69c and 65c for driving the cylinders and belt, respectively. The driving control sections 79 and 80 connected to the longitudinal heat seal bars 43 and the transverse heat seal bars 46 have temperature controllers 79c and 80c, respectively. In the present embodiment, the driving control sections 64, 67, 69, 65, 79 and 80 form a packing driving section 81.

In the packing system 132 according to the present embodiment, the packing control unit 62 connected to the LAN cable 63 is provided through the optical fiber 61a and the photoelectric converter 61 as described above. The packing control unit 62 includes a packing control section 62a, the operation indicating section 62b, and a display section 62c formed of a LCD or the like. The operation indicating section 62b causes the display section 62c to display a prompt screen, inputs operating conditions such as a set temperature and an operation time of each seal section, an operation time of cutter 48, delay times of various operation and the like, and sets the same conditions to the packing control section 62a and the CPU boards 64a, 67a, 69a, 65a, 79a and 80a. The operation indicating section 62b causes the display section 62c to properly display a temperature of each seal section, a packing speed, the operating conditions, the contents of an alarm and the like. In the present embodiment, the packing control section 62a performs single management of the whole packing system 132.

Since the packing system 132 according to the present embodiment sends and receives the control information, the response information and the like through the LAN cable 63 at a high speed, it is excellent in quick response to the control information. Furthermore, the configuration of the packing system can easily be varied. For example, air cylinders can easily be added or removed, and sensors can easily be added or removed. Examples of a change in the system include addition of film edge sensors 112, 112 for detecting a slippage of the packing film 42, eyemark sensors 113, 113 for detecting registration marks printed on the packing film 42, a film near-end sensor 114 for detecting that the supply of packing film 42 is running short, a sensor 115 (not shown) for detecting intrusion of articles to be weighed or the like into the transverse heat seal bars 46 and the like, as shown in FIG. 7.

While the CPU boards 64a, 67a, 69a, 65a, 79a and 80a and the LAN interfaces 64b, 67b, 69b, 65b, 79b and 80b have been provided on the driving control sections 64, 67, 69, 65, 79 and 80 of the air cylinders 44, 47 and 49, the belt 45, and the heat seal bars 43 and 46, respectively, in the present embodiment, the CPU boards and the LAN interfaces can be collected together such that the air cylinders 44, 47 and 49, the belt 45, and the heat seal bars 43 and 46 can be controlled by a single board which functions as both a CPU and a LAN interface.

Also in the present embodiment, the parallel signal line 126 is formed by four signal lines. In the same manner as in the embodiment of FIG. 1, each signal line receives four interlock signals. The optical fiber 66a, the photoelectric converter 66 and the serial line 66b are used for the operation indicating section 62b to set operating conditions on a weighing system side and to cause the display section 62c to display an operation state on the weighing system side.

Also in the weighing and packing system according to the present embodiment, the packing system side is connected to the weighing system side through the parallel signal line 126. Therefore, the interlock signal to be sent and received between the systems can be transmitted rapidly. The operation indicating section 62b can set the operating conditions of the weighing and packing system, and can display the operation state. Consequently, single management of the weighing and packing system can be performed.

According to the present invention, the weighing system 121 of the weighing and packing system 120 shown in FIG. 1 and the packing system 132 shown in FIG. 9 can be used to form a weighing and packing system. The weighing and packing system is formed by connecting the LAN cable 23 (FIG. 1) of the weighing system 121 to the LAN cable 63 (FIG. 9) of the packing system 132 directly or through a repeater. Such a weighing and packing system has exact characteristics of the weighing system 121 and the packing system 132, and features that control information and data can be sent and received at a high speed between the weighing system 121 and the packing system 132. In this case, it is not necessary to provide the optical fiber 32a, the photoelectric converter 32 and the serial line 32b, and the optical fiber 66a, the photoelectric converter 66 and the serial line 66b.

Figure 10:
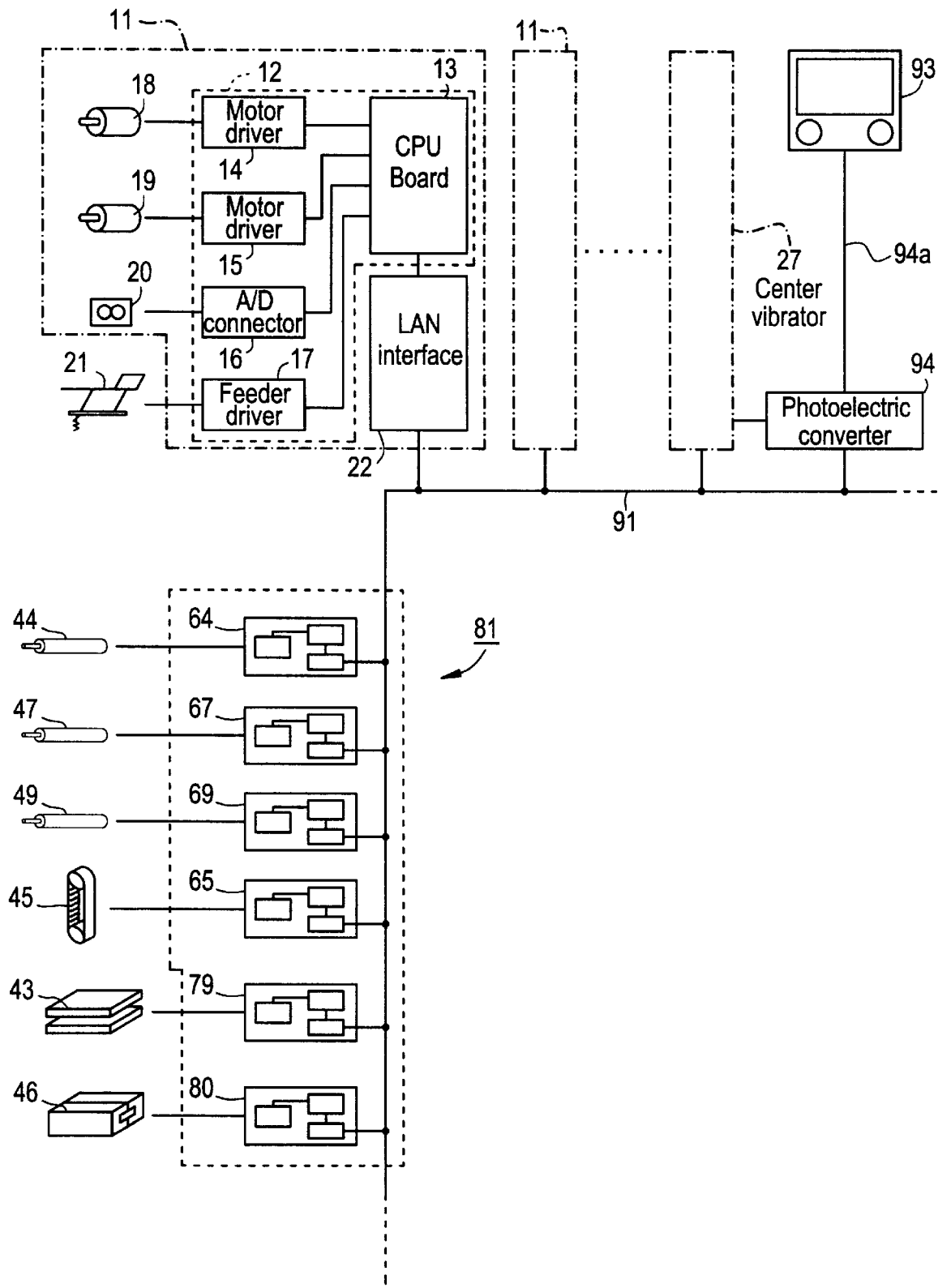
FIG. 10 is a block diagram showing a schematic structure of a weighing and packing system according to yet another embodiment of the present invention.

FIG. 10 shows a further embodiment of the weighing and packing system according to the present invention. In the weighing and packing system according to the present embodiment, portions other than the weighing control unit 26, the optical fiber 25 and the photoelectric converter 24 of the weighing system 121 shown in FIG. 1 are connected to portions other than the packing control unit 62, the optical fiber 61a and the photoelectric converter 61 of the packing system 132 shown in FIG. 9 through a LAN cable 91, and the weighing control unit and the packing control unit are collected as a weighing and packing control unit 93 which is connected to the LAN cable 91 through an optical fiber 94a and a photoelectric converter 94.

The weighing and packing system according to the present embodiment also has excellent quick response to control information and flexibility with addition and change of hardware. In addition, single management of the weighing and packing system can be performed.

Figure 11:
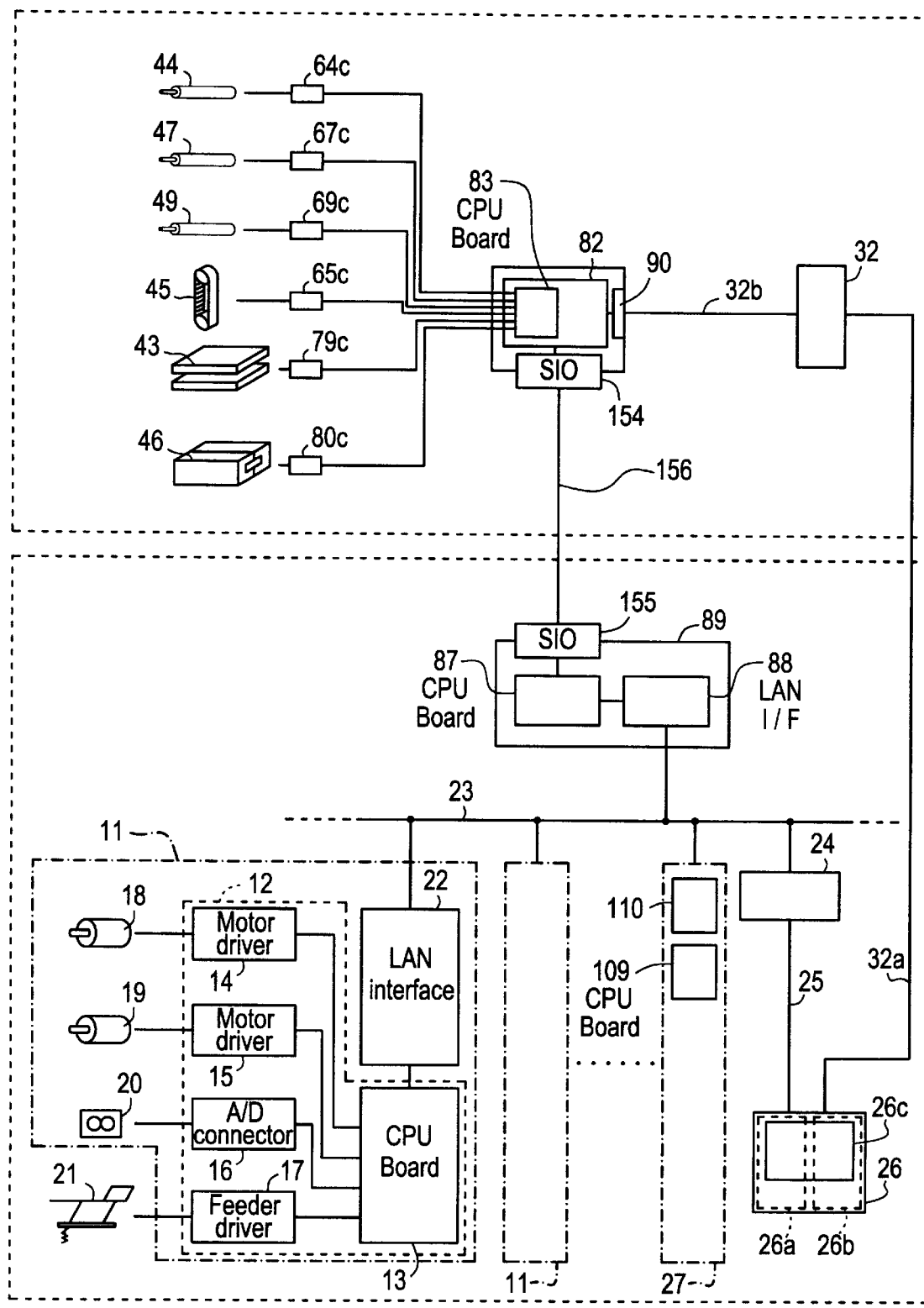
FIG. 11 is a block diagram showing a schematic structure of a weighing and packing system having a serial signal line according to an embodiment of the present invention.

Furthermore, the weighing and packing system according to the present invention can have a structure in which a serial signal line 156, a first serial interface 155 and a second serial interface 154 are provided in place of the parallel signal line 86, the first parallel interface 85 and the second parallel interface 84 in FIG. 1 as shown in FIG. 11. With this structure, all the above-mentioned signals are usually sent and received through the weighing control unit 26, the optical fiber 32a, the photoelectric converter 32 and the serial line 32b. If abnormalities such as disconnection are caused, all signals are sent and received through the serial signal line 156, the first serial interface 155 and the second serial interface 154. Also in the case where the interlock signal is transmitted with delay through the optical fiber 32a and the like for some reasons, it can be sent and received through the serial signal line 156. Thus, a transmission line of the signal is caused to have redundancy so that it is not necessary to stop weighing and packing operation even if abnormalities are caused on the optical fiber 32a and the like which are usually used.

Figure 12:
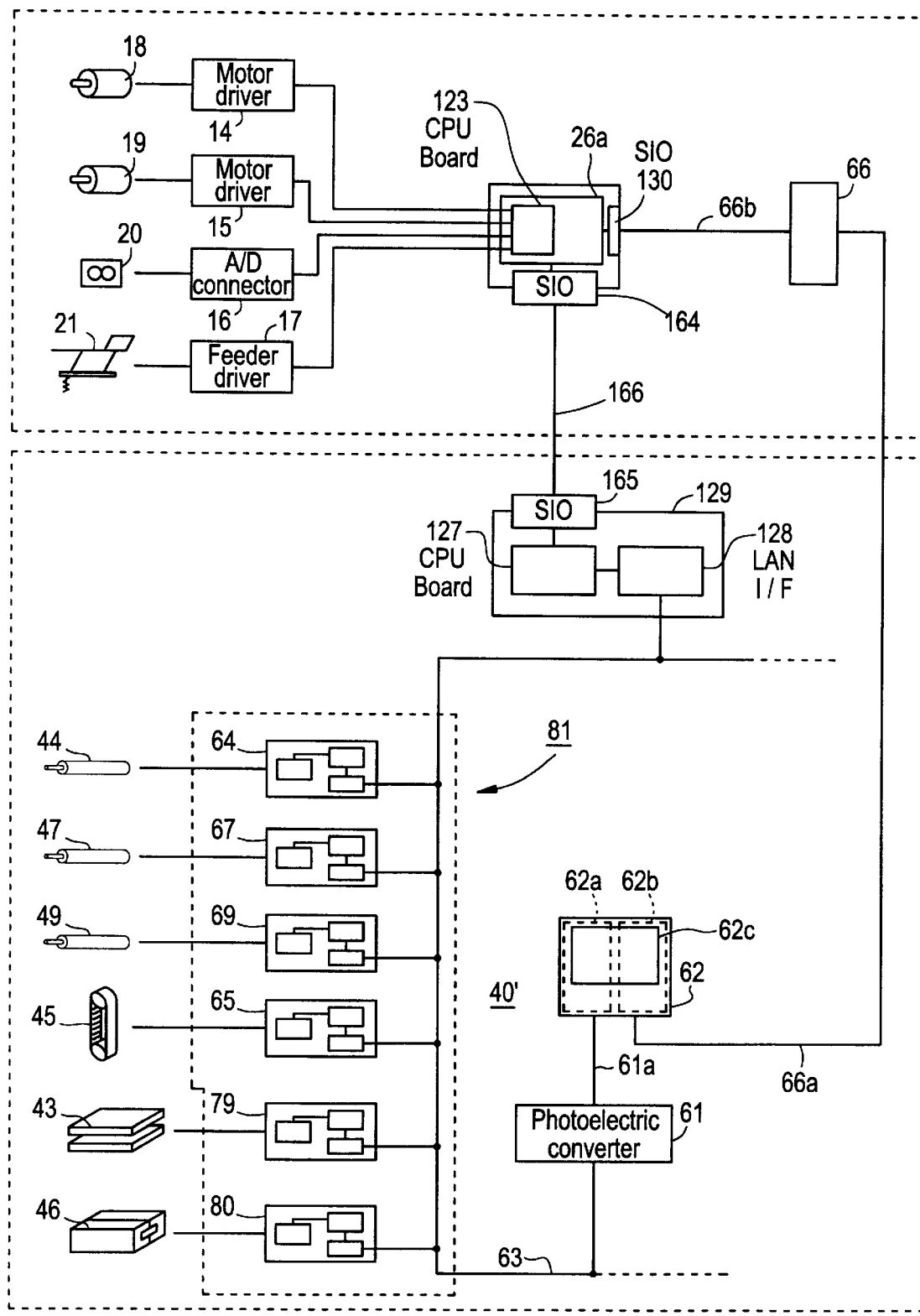
FIG. 12 is a block diagram showing a schematic structure of a weighing and packing system having a serial signal line according to another embodiment of the present invention.
Figure 13:
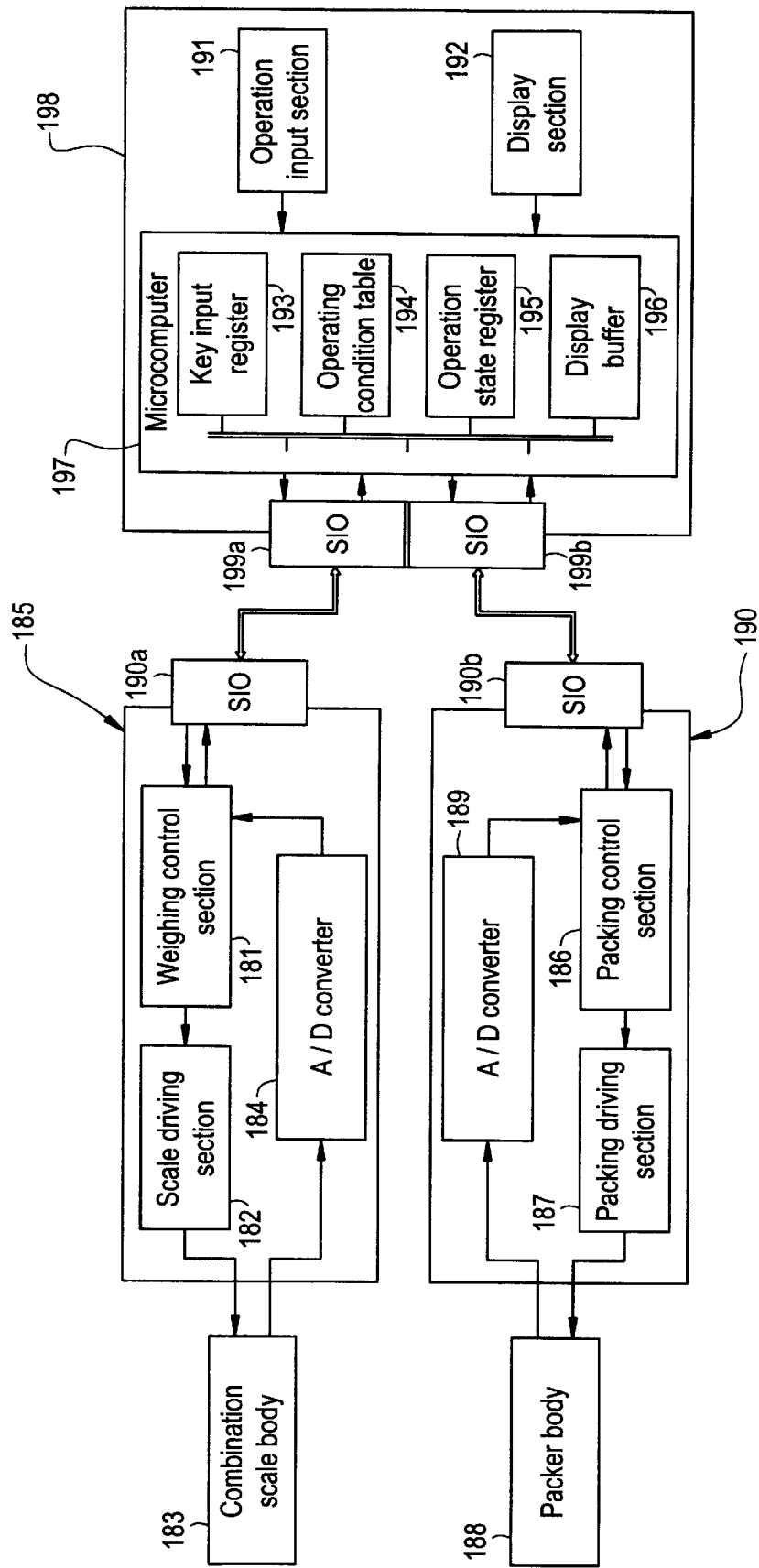
FIG. 13 is a block diagram showing a weighing and packing system according to the prior art.

The weighing and packing system according to the present invention can also have a structure in which a serial signal line 166, a first serial interface 165 and a second serial interface 164 are provided in place of the parallel signal line 126, the first parallel interface 125 and the second parallel interface 124 in FIG. 8 as shown in FIG. 12. Also in this structure, all the above-mentioned signals are always sent and received through the packing control unit 62, the optical fiber 66a, the photoelectric converter 66 and the serial line 66b. In the same manner as in FIG. 11, a transmission line of the signal has redundancy. Therefore, also in the case where abnormalities are caused on the optical fiber 66a and the like which are usually used, it is not necessary to stop the weighing and packing operation.

The weighing and packing system of the present invention has a structure in which the weighing driving section for causing the weighing unit to perform weighing operation and the weighing control section for controlling the weighing driving section are mutually connected to the weighing system through the LAN. Therefore, excellent quick response to control information can be obtained and hardware such as the weighing unit can be added and changed rapidly.

The weighing and packing system according to the present invention has a structure in which the packing driving section for causing the packer to perform packing operation and the packing control section for controlling the packing driving section are mutually connected to the packing system through the LAN. Therefore, excellent quick response to control information and the like can be obtained and the hardware can be added and changed rapidly.

Furthermore, since the weighing and packing system according to the present invention has a structure in which the weighing system and the packing system are connected to each other through the parallel signal line, it has excellent quick response to the interlock signal.

The weighing and packing system according to the present invention has a structure in which the weighing system and the packing system are connected to each other through the serial signal line. Therefore, the transmission line of the signal can have redundancy. Also in the case where abnormalities are caused on the optical fiber and the like which are usually used, they can be eliminated while continuously performing the weighing and packing operation.

Although the present invention has fully been described by way of example with reference to the accompanying drawings, it is to be understood that various changes and modifications will be apparent to those skilled in the art. Therefore, unless otherwise such changes and modifications depart from the scope of the invention, they should be construed as being included therein.

What is claimed is:

1. A weighing and packing system comprising:
    a weighing system including a plurality of weighing units forming a combination scale, a weighing driving section provided on each of the weighing units for causing the weighing unit to perform weighing operation, a weighing control unit having a weighing control section for controlling the weighing driving sections, and an operation indicating section for setting operating conditions of the weighing system and for displaying an operation state;
    a local area network (LAN) mutually connecting the weighing driving sections and the weighing control unit;

a first parallel interface connected to the LAN;

a packing system including a packer for packing articles to be weighed, a packing driving section for causing the packer to perform a packing operation, and a packing control section for controlling the packing driving section;

a second parallel interface connected to the packing system;

a parallel signal line for connecting the first parallel interface to the second parallel interface; and signal transmitting means for serially connecting the operation indicating section of the weighing system to the packing control section, wherein the operation indicating section sets operating conditions of the weighing system and displays an operation state of the weighing system, wherein the operation indicating section sets operating conditions of the packing system via the signal transmitting means, wherein the operating indicating section displays an operation state of the packing system as indicated by the weighing system via the signal transmitting means, and wherein the parallel signal line sends and receives an interlock signal between the weighing driving section and the packing driving section.

2. A weighing and packing system comprising:

a weighing system including a plurality of weighing units, each of which forms a combination scale and has a weighing driving section for causing weighing operation to be performed, a weighing control section for controlling the weighing driving sections;

a first parallel interface connected to the weighing system;

a packing system including a packer for packing articles to be weighed, a packing driving section for causing the packer to perform packing operation, and a packing control unit having a packing control section for controlling the packing driving section and an operation indicating section for setting operating conditions of the packing system and for displaying an operation state;

a local area network (LAN) mutually connecting the packing driving section and the packing control unit;

a second parallel interface connected to the LAN;

a parallel signal line for connecting the first parallel interface to the second parallel interface; and signal transmitting means for serially connecting the operation indicating section of the packing system to the weighing control section, wherein the operation indicating section sets operating conditions of the packing system and displays an operation state of the packing system, wherein the operation indicating section sets operating conditions of the weighing system via the signal transmitting means, wherein the operating indicating section displays an operation state of the weighing system as indicated by the packing system via the signal transmitting means, and wherein the parallel signal line sends and receives an interlock signal between the weighing driving section and the packing driving section.

3. The weighing and packing system as defined in any of claims 1 or 2, further comprising a center vibrator unit connected to the LAN for feeding an article to be weighed to the weighing unit, the center vibrator unit including a center vibrator for feeding the article to the weighing unit by vibration, a feeder driver for driving the center vibrator, article detecting means for detecting a quantity of the article on the center vibrator, and digital converting means for converting an input from the article detecting means to a digital signal.

4. The weighing and packing system as defined in any of claims 1 or 2, further comprising an assembled gate unit connected to the LAN, the assembled gate unit including drivers for driving an assembled gate for storing the article discharged from the weighing unit and for discharging the same article in a predetermined timing, and a gate switch to open or close the assembled gate.

5. The weighing and packing system as defined in any of claims 1 or 2, wherein each weighing unit includes a weighing hopper for holding articles to be weighed, said weighing hopper having a gate moveable to an open position for discharge of articles from the weighing hopper, an actuator device for opening the gate of the weighing hopper, and a load cell for weighing articles in the weighing hopper, said weighing driver section including a driver for driving the actuating device, and an A/D converter for A/D converting a weighed value from the load cell.

6. The weighing and packing system as defined in claim 3, wherein each weighing unit includes a weighing hopper for holding articles to be weighed, said weighing hopper having a gate moveable to an open position for discharge of articles from the weighing hopper, an actuator device for opening the gate of the weighing hopper, and a load cell for weighing articles in the weighing hopper, said weighing driver section including a driver for driving the actuating device, and an A/D converter for A/D converting a weighed value from the load cell.

7. The weighing and packing system as defined in claim 4, wherein each weighing unit includes a weighing hopper for holding articles to be weighed, said weighing hopper having a gate moveable to an open position for discharge of articles from the weighing hopper, an actuator device for opening the gate of the weighing hopper, and a load cell for weighing articles in the weighing hopper, said weighing driver section including a driver for driving the actuating device, and an A/D converter for A/D converting a weighed value from the load cell.

8. The weighing and packing system as defined in any of claims 1 or 2, wherein the packer is operable to make bags for receiving quantities of articles weighed by the combination scale, said packer comprising one or more heat seal bars for sealing film to make said bags, one or more belts for feeding said film, one or more sensors, and one or more actuators for opening and closing the heat seal bars, and wherein the packing driving section includes a driver for driving the actuators, a driver for driving the belt, a controller for controlling the one or more sensors, and a controller for controlling the temperature of the heat seal bars.

9. The weighing and packing system as defined in claim 3, wherein the packer is operable to make bags for receiving quantities of articles weighed by the combination scale, said packer comprising one or more heat seal bars for sealing film to make said bags, one or more belts for feeding said film, one or more sensors, and one or more actuators for opening and closing the heat seal bars, and wherein the packing driving section includes a driver for driving the actuators, a driver for driving the belt, a controller for controlling the one or more sensors, and a controller for controlling the temperature of the heat seal bars.

10. The weighing and packing system as defined in claim 4, wherein the packer is operable to make bags for receiving quantities of articles weighed by the combination scale, said packer comprising one or more heat seal bars for sealing film to make said bags, one or more belts for feeding said film, one or more sensors, and one or more actuators for opening and closing the heat seal bars, and wherein the packing driving section includes a driver for driving the actuators, a driver for driving the belt, a controller for controlling the one or more sensors, and a controller for controlling the temperature of the heat seal bars.

* * * * *

UNITED STATES PATENT AND TRADEMARK OFFICE
CERTIFICATE OF CORRECTION

PATENT : 6,046,411
DATED : April 4, 2000
INVENTOR(S): Shozo Kawanishi et al.

It is certified that error appears in the above-identified patent and that said Letters Patent is hereby corrected as shown below:

On the title page: Item [73]    the Assignee incorrectly reads "Yamato Scales Co., Ltd., Hyogo, Japan" whereas the correct Assignee is ---Yamato Scale Co., Ltd., Hyogo, Japan---.

Signed and Sealed this

Twentieth Day of March, 2001

*Attest:*

NICHOLAS P. GODICI

*Attesting Officer*   *Acting Director of the United States Patent and Trademark Office*